United States Patent [19]
Arroyo et al.

[11] Patent Number: 4,938,560
[45] Date of Patent: Jul. 3, 1990

[54] ANIMAL-RESISTANT CABLE

[75] Inventors: Candido J. Arroyo, Lithonia; Paul F. Gagen, Duluth; Parbhubhai D. Patel, Dunwoody, all of Ga.

[73] Assignee: AT&T Bell Laboratories, Murray Hill, N.J.

[21] Appl. No.: 392,330

[22] Filed: Aug. 11, 1989

Related U.S. Application Data

[63] Continuation-in-part of Ser. No. 194,760, May 17, 1988, Pat. No. 4,874,219.

[51] Int. Cl.$^5$ .............................................. G02B 6/44
[52] U.S. Cl. .................................................. 350/96.23
[58] Field of Search ................ 350/96.23, 96.29, 96.30

[56] References Cited

U.S. PATENT DOCUMENTS 4,701,016 10/1987 Gartside et al. ................. 350/96.23

OTHER PUBLICATIONS

Article authored by N. J. Cogelia, et al. entitled "Rodent Biting Pressure and Chewing Action and Their Effects on Wire and Cable Sheath", which appeared beginning on p. 117 of the proceedings of the 25th International Wire and Cable Symposium held in 1976.

Article authored by R. A. Connolly & N. J. Cogelia entitled "The Gopher and Buried Cable".
Two brochures of Stratoglas, a division of Air Logistics Corp. Article authored by G. J. Beveridge, et al. entitled "Fiber Cable Wears An Extruded Jacket", published in Apr. 1985, *Telephone Engineer & Management.*

*Primary Examiner*—William L. Sikes
*Assistant Examiner*—Robert E. Wise
*Attorney, Agent, or Firm*—Edward W. Somers

[57] ABSTRACT

An animal-resistant optical fiber cable (20) includes a core (22) which comprises a transmission medium and a sheath system. The sheath system includes an outer jacket (65) and a dielectric armor (40) in the form of a shell. The shell comprises a plurality of longitudinally extending preformed segments (42—42) each having a cross section transverse to a longitudinal axis of the cable each of which covers less than half of the periphery of the core. Further, the shell segments are stranded helically about the core with at least portions of longitudinal edge surfaces of adjacent segments being in engagement with each other. The shell segments not only provide rodent protecting for the cable, but also they provide suitable tensile and compressive strength. Further, because the cable in the preferred embodiment has an all-dielectric sheath system, it is inherently lightning, corrosion and EMP resistant.

18 Claims, 2 Drawing Sheets

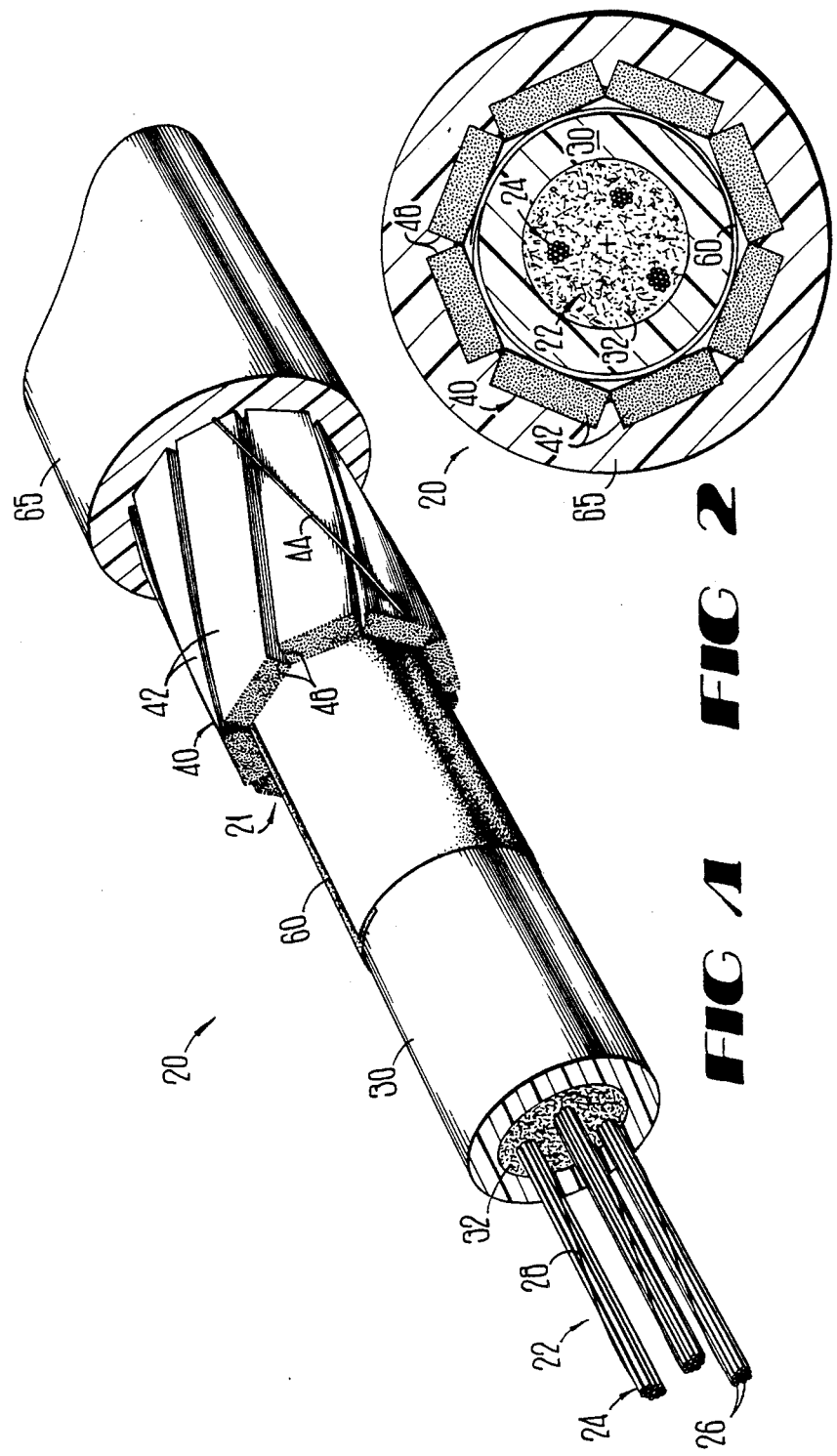

ANIMAL-RESISTANT CABLE

This application is a continuation-in-part of application Ser. No. 07/194,760 filed on May 17, 1988 in the names of C. J. Arroyo and P. D. Patel, said application Ser. No. 07/194,760 being commonly assigned herewith and being allowed as U.S. Pat. No. 4,874,219.

TECHNICAL FIELD

This invention relates to an animal-resistant cable. More particularly, it relates to a cable having at least a partially dielectric sheath system which includes a plurality of longitudinally extending members which because of their shape and mechanical properties and disposition about a core of the cable provide excellent protection against rodents, for example, while not affecting adversely the flexibility of the cable.

BACKGROUND OF THE INVENTION

Communications cables which are strung between poles or those which are buried in the ground are subjected to abuse such as, for example, attack by animals, mechanical abrasion and crushing. Attacks by gophers on buried cable and by squirrels on aerial cable have been a continuing concern. Gophers, for example, have been shown to exert biting pressures as high as 124,044 k Pa. Cables having an outside diameter below a critical size of about 2 cm in diameter and which do not have suitable protective armor are more apt to be damaged than larger cables because the animals can bite directly down on them. For larger size cables, only a scraping or raking action takes place. In fact, on cables exceeding about 5.1 cm in diameter, gopher attack is rarely observed.

An excellent discussion of this problem was presented at the 25th International Wire and Cable Symposium. A written version of that presentation appears beginning at page 117 in the proceedings of that conference being authored by N. J. Cogelia, G. R. LaVoie, and J. G. Glahn and being entitled "Rodent Biting Pressure and Chewing Action and Their Effects on Wire and Cable Sheath".

Many rodents, and in particular the plains pocket gopher (*Geomys bursarius*) and the fox squirrel (*Scirus niger*), habitually chew on communication cables. Such chewing frequently causes immediate damage to the cable's wiring or optical fibers or results in damage when rain water or other moisture enters holes gnawed through protective outer jacketing. In the case of rodents, chewing on objects which are tough in composition is necessary to prevent their ever-growing incisor teeth from overgrowing. Thus, for relatively small cables, simply providing a hard outer cable jacket, such as rigid polyvinyl chloride (PVC), for example, is insufficient and may even provide an inducement rather than a deterrent to chewing by rodents.

Because it is frequently undesirable or impractical simply to kill the rodents, it is necessary to device nonlethal apparatus and methods whereby rodents will be prevented or deterred from attacking cables. Numerous behavioral studies have been performed which show that behavioral barriers can be induced by causing an undesirable effect to result immediately after an act by an animal is performed. The animal then associates the undesirable result with the immediate preceding act and thereafter changes its behavior to prevent the undesirable result. In one prior art patent, this knowledge is utilized to incorporate, in a cable assembly, a non-lethal but toxic chemical agent which is capable of causing rapid illness thereby inducing a behavioral barrier resulting in a behavioral change opposed to the cable chewing.

It has been found that an effective way to protect directly exposed cables from rodent attack is to wrap them in a metallic shield, preferably one which is applied longitudinally. The prior art is replete with patents relating to metallic sheath systems for copper core cables such as one comprising an aluminum shield enclosed by a carbon steel shield with each having a longitudinal seam. This sheath system offers protection from mechanical damage, and its cost is quite low because it is made in a single pass at relatively high line speeds. However, the use of a shield which is made of carbon steel occasionally has resulted in long term failures, even in cables larger than 2 cm. Failure may occur because the underlying steel shield may become exposed when rodents violate the jacket. Once exposed, the steel shield, which withstands the initial attack by rodents, may corrode readily. This may render it ineffective for general mechanical protection and for protection from any subsequent rodent attack. In this regard, it should be pointed out that gophers are territorial animals which repeatedly return to areas previously occupied by them. Therefore, it is not uncommon to experience secondary attacks in the same location along a cable. The prior art includes the use of stainless steel shields to protect against rodent attacks. Stainless steel is used so that after an initial attack, where the steel layer has been exposed, the shield does not corrode readily and can withstand repeated rodent attacks over time. For larger diameter cables, the use of a corrugated shield having a longitudinally overlapped seam generally has provided sufficient protection. However, in the smaller sizes, wherein rodents have been able to encompass the cable with their teeth and pull open the seam inadequate shield arrangements can lead to failures.

In another prior art approach to rodent protection, an all-dielectric optical fiber cable is disposed within an extruded plastic duct having an inner diameter which is significantly larger than the outer diameter of the cable. Such a structure is disclosed in an article entitled "Fiber Cable Wears An Extruded jacket" which was authorized by G. J. Beveridge, et al., and which appeared in the Apr. 15, 1985 issue of *Telephone Engineer and Management* beginning at page 100. The outer diameter of the duct is sufficiently large to prevent rodents from enveloping the duct with their jaws. A cable installation having an additional duct adds to the cost of the installation.

Notwithstanding the hereinabove described solutions, others have been sought after. The use and handling of toxic chemicals is certainly not desired. Ordinary steel shields may corrode and stainless steel shields are not impervious to lightning. Also, the expense in the material cost and the application of an extra duct is a solution which certainly invites innovation.

The sought-after cable must be cost-effective and easily manufactured. Hopefully, it provides the cable with protection against rodent attacks without compromising other properties of the cable such as, for example, its flexibility. Also, the sought-after protection must be such that it can be included as a portion of the sheath system for use in any cable be it one which includes optical fibers or metallic conductors.

There is also a desire that a sought-after cable include an all-dielectric sheath system. Cables which are installed in areas characterized as medium to high lightning areas may be damaged by lightning strikes. Metallic sheathed fiber optic cables can be affected by lightning in several ways. Thermal damage may be caused by the heating effects of the lightning arc whereas in buried cables, mechanical damage may result, causing crushing and distortion of the sheath.

As may well be imagined, a cable having an all-dielectric sheath system which provides protection against rodent attacks as well as lightning would be welcomed. Such a cable would provide other advantages. An all dielectric cable avoids problems associated with corrosion. In addition, in the past, the oxidation of metallic sheaths including aluminium has led to the generation of hydrogen which could cause optical fiber transmission losses. An all-dielectric cable sheath system avoids this problem. Also, an all-dielectric cable sheath system offers enhanced survivability to electromagnetic pulse (EMP) effects and can be made immune to satellite detection.

Seemingly, the prior art does not offer a cable which is free of the above described shortcomings of presently available cables. There are cables having all-dielectric sheath system and there are cables which provide protection against rodent attacks and lightning, but there appears to be no such sheath system which provides both kinds of protection. Such a cable which has long been soughtafter must be cost-competitive. Further, it must include a sheath system which is easily removed to access safely the core which could include, for example, optical fibers.

SUMMARY OF THE INVENTION

The foregoing shortcomings of the prior art have been overcome by cables of this invention. An animal-resistant cable comprises a core which includes at least one transmission media, and a sheath system which encloses said core. At least a portion of the sheath system is non-metallic and includes a plurality of longitudinally extending, preformed strength members. The longitudinally extending members which are referred to as segments form a shell that encloses the core. In order to provide sufficient flexibility for the cable to be plowed into the ground in a buried installation, the number of shell segments must be such that each encloses less than one half of the periphery of the core and the shell segments are stranded helically about the core. An outer element disposed about the segments maintains the segments in the configuration of a shell.

The shell segments which are generally contiguous to each other along at least portions of facing adjacent longitudinal edge surfaces cooperate to form a substantially circular enclosure for the core. The shell segments may be performed to cause the longitudinal edge surfaces of each to extend generally radially from a longitudinal axis of the cable. In a preferred embodiment, a rodent resistant cable sheath system includes eight shell segments. Each segment extends about an equal length of the periphery defined by the inner surfaces of the segments.

The segments each are made of a material which discourages repeated attack by animals. The shell segments may be made of a homogenous dielectric polymeric matrix material or of a matrix material which may be a cured resinous material, such as an epoxy resin, for example. Also the rodent-resistant portion of this sheath system may be made of any of other plastic materials, i.e. acetels, acrylics, fluorocarbons, nylon, polycarbonate, fiber reinforced plastics, or polyolefins, for example, which may be sufficiently thin so as not to affect adversely the flexibility of the cable. The flexibility of the sheath system is enhanced because of the stranding of the segments about the longitudinal axis of the cable and because of the number of segments which are used to provide the enclosure.

Provisions also are made to prevent the entry of water into the cable core. This may be accomplished by introducing a water blocking material into the sheath system either as a coating on the segments or as a separate element of the sheath system.

BRIEF DESCRIPTION OF THE DRAWING

Other features of the present invention will be more readily understood from the following detailed description of specific embodiments thereof when read in conjunction with the accompanying drawings, in which:

FIG. 1 is a perspective view of a cable of this invention;

FIG. 2 is an end cross-sectional view of the cable of FIG. 1;

DETAILED DESCRIPTION

Figure 3:
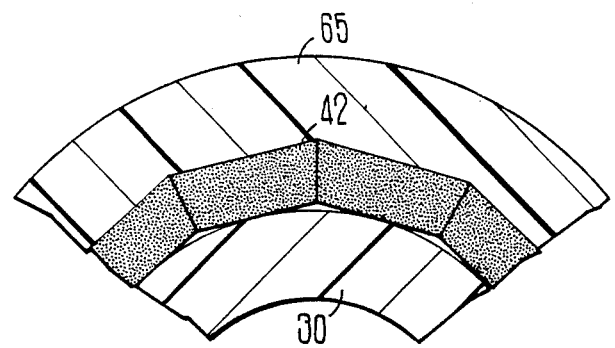
FIG. 3 is a partial end cross-sectional view of another embodiment of the cable of FIG. 1.

Referring now to FIGS. 1 and 2, there is shown a cable which is designated generally by the numeral 20 and which is a cable having an all-dielectric sheath system 21. The structure is such that it can provide excellent protection against rodent attacks and lightning.

As can be seen in FIGS. 1 and 2, the cable 20 includes a core 22 which comprises at least one transmission media. For example, the core 22 may comprise one or more units 24—24 each of which includes a plurality of optical fibers 26—26. Each of the units 24—24 is provided with a binder 28. The unit or units is disposed within a tubular member 30 which is made of a plastic material such as polyethylene, for example.

An inner diameter of the tubular member 30 is such as to control the ratio of the total cross-sectional area of the coated optical fibers within the core to the cross-sectional area defined by the inner surface of the wall of the tubular member. This allows the optical fiber unit or units sufficient movement during handling, installation and temperature cycling to avoid losses due to microbending.

Further, the tubular member, or core tube as it is often called, may be filled with a suitable water blocking material 32. Such a material may be one such as that disclosed and claimed in U.S. Pat. No. 4,701,016 which issued on Oct. 20, 1987 in the names of C. H. Gartside, III, et al. and which is incorporated by reference hereinto.

Figure 4:
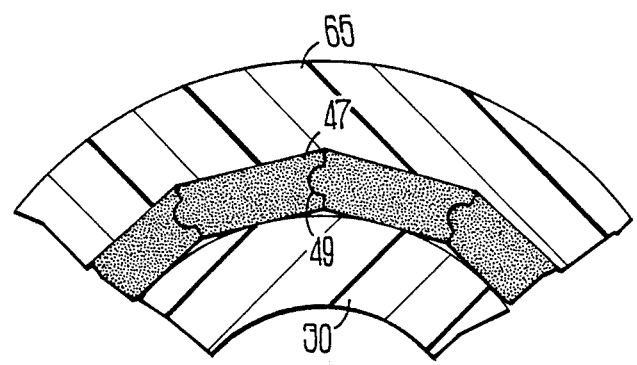
FIG. 4 is an enlarged view of a portion of interlocking shell segments in another embodiment of this invention.

About the core tube is disposed a dielectric armor which is in the form of a shell and which is designated generally by the numeral 40. The shell 40 comprises a plurality of individual preformed segments 42—42. The segments 42—42 are such that they cooperate to provide a generally circular shell 40 for the core tube. Each segment 42 may have a rectangular or trapezoidal (see FIG. 3) or arcuately shaped cross section transverse to a longitudinal axis at the segment. Further, the segments are arranged so that at least portions of longitudinally extending side edge surfaces 48—48 of each are contiguous to at least portions of longitudinally extending side edge surfaces of adjacent segments. Each shell segment 42 may be performed to cause the longitudinal side surfaces 48—48 thereof to extend generally along radial lines from a longitudinal axis of the cable when the shell segment is disposed about the core. In one embodiment, the segments 42—42 may be bound with a binder 44 which is wrapped helically about the shell, although this is not necessary to hold the segments together. It is within the scope of this invention to include shell segments 47—47 (see FIG. 4) which interlock along longitudinal edge surfaces 49—49 thereof and which have a tongue and groove configuration, for example. This helps to prevent ingress of water through the sheath system and into the core and helps to bring the shell segments into alignment during their assembly in a manufacturing process.

The shell 40 must be such that it does not impair the flexibility of the cable. For a cable which has a non-metallic sheath system and which is plowed into the ground in a buried installation, the cable must be capable of experiencing a bend radius approximately equal to or less than the product of ten and the outer diameter of the cable without damaging the cable. Suitable flexibility is accomplished in two ways, first by causing the segments to be wrapped helically about the tubular member. Of course, the lay may be varied depending on cable size and use. Also, suitable flexibility is achieved by controlling the number of segments 42—42 in the shell 40.

The shell 40 may comprise any number of segments 42—42 as long as each covers less than one-half the periphery of the core. In a preferred embodiment, eight segments 42—42 are used. It has been found that the larger the number of segments, the more flexible is the cable. However, too many segments will impede the alignment of the segments during their assembly about the core to form the shell 40. Also, inasmuch as seams between the shell segments may be most susceptible to rodent penetration, an unnecessary increase in the number of segments may increase the vulnerability of the cable to rodent damage.

Each of the segments 42—42 may be made of a homogeneous solid dielectric polymeric matrix material. However, the material from which the segments are made may be any one of a number of materials which are available commercially. What is important is that such material has relatively high tensile strength, relatively high compressive strength, is non-metallic and is a material which has a relatively high hardness and impact resistance such that upon contact with the mouths of rodents further attack is discouraged. Such materials include, for example, Noryl ® thermoplastic, Torlon poly amide-imide, Udel ® polysulfone, acrylic-PVC, Kynar ® polyvinylidene fluoride and, LEXAN ® polycarbonate, for example. Also, each segment may be made of a fiber reinforced plastic material. In a preferred embodiment, each shell segment 42 is characterized by a tensile stiffness of about 131 kg per one percent strain.

The radial thickness of each segment also is important. If too thick, the flexibility of the cable may be affected adversely. If too thin, the segments may break down under stress imparted to the cable.

For a cable 20 which includes three units 24—24 each including twelve coated optical fibers having an outer diameter of 250 μm, the inner diameter of the core tube 30 may be about 0.63 cm and the outer diameter about 0.78 cm. Eight shell segments each comprising fiber reinforced plastic material each having a thickness of about 0.90 mm may be used to provide an enclosing shell 40. The shell segments are stranded helically each with a lay of about 30 cm.

It may also be important that the cable 20 include provisions for preventing the ingress of water to the core. In the embodiment of FIGS. 1 and 2, water entry into the core is prevented by disposing a water blockable tape 60 between the shell 40 and the tubular member 30.

The water blockable tape 60 may comprise a laminate which includes a swellable superabsorbent powder disposed between two layers of non-woven tapes. Preferably, the tape 60 is made of a hydrophobic material which has been treated with a water blockage material. Advantageously, the treated tape is hydrophilic. A hydrophilic material is one that has a strong affinity for water in that it absorbs water easily.

Preferably, the tape 60 is a spunbonded, non-woven polyester material and includes a web structure comprised of randomly-arranged fibers which are bonded primarily at the filament crossovers. Continuity of the fibers of the web will provide the web with an increased tensile strength. The fibers may be formed of any plastic resin, or other appropriate material, which is substantially nonhygroscopic, and which has the capability of maintaining its shape in the presence of the temperatures encountered during extrusion of a portion of the cable 20. The fibers of the web structure are arranged so that air cells or pockets are formed.

A polyethylene terephthalate fiber product, formed into a web structure as described above, has been identified under the registered trademark "Reemay" by the E. I. du Pont de Nemours and Company, Incorporated of Wilmington, Del. Presently, the Reemay ® web structure is available in various thicknesses and densities from Reemay, Inc. of Old Hickory, Tennessee. The properties of Reemay ® tapes are further defined and described in Bulletin R-1, dated March, 1986, entitled "Properties and Processing of Reemay ® Spunbonded Polyester" from E. I. du Pont de Nemours and Company, Incorporated, Wilmington, Delaware.

Although in a preferred embodiment, a spunbonded polyester tape is used, others also are acceptable. For example, the tape which is to be impregnated may be a nylon spunbonded fabric, non-woven glass, polypropylene melt blown non-woven fabric, polyurethane spunbonded fabric or TCF fabric, for example.

Another important characteristic of the tape 60 is the stiffness of the body of the material which comprises the tape. Within limits, as the material of the tape 60 is made increasingly stiffer, it is still relatively easy to form the tape longitudinally about the core tube 30, without wrinkling. However, it is important that the material be supple and flacid enough to conform readily to the contour of the outer surface of the core tube so that a minimal peripheral dimension is presented over which the shell segments 42—42 are applied. As a desirable consequence, a minimum overall diameter is achieved for the cable which will meet all the necessary requirements.

Stiffness of the material for the tape 60 is controlled by a combination of factors such as the number of fibers per unit volume, thickness of the material, size of the fibers and the amount and type of binder used in the material. Increasing the thickness of the material obviously increases the cost of the material per unit of surface area of cable covered. Increasing the number of the fibers per unit volume or increasing the amount of binder tends to decrease the ability of the material to prevent heat transfer. Thus, at least four factors, formability of the tape 60, cost of the tape, insulative capability of the tape, and its water blocking capability must be considered and balanced in providing the proper material for use on a particular cable.

In a preferred embodiment, the spunbonded polyester tape 60 combines the thermal, chemical and mechanical properties of polyester fibers with a spunbonded structure to provide a tape which is suitable for use in a communications cable. These properties include a relatively high tensile strength and elongation, excellent tear strength, and resistance to temperatures as high as about 254° C.

In order to render the substrate tape swellable upon contact with moisture, the carrier tape 60 is impregnated with a suitable water swellable material which herein is referred to as a superabsorbent material. Superabsorbents are hydrophilic materials which can absorb and retain water under pressure without dissolution in the fluid being absorbed. See J. C. Djock and R. E. Klern "Review of Synthetic and Starch-Graft Copolymer Superabsorbents" prepared for the Absorbent Products Conference held November 16-17, 1983 in San Antonio, Texas and incorporated by reference hereinto. Properties such as enzyme stability, biodegradability, absorbent capacity and rate of uptake are used to characterize a superabsorbent material. One of the early superabsorbents was a saponified starch graft polyacrylonitrile copolymer. See U.S. Pat. No. 3,425,971. The above-identified patent discloses saponifying starch-graft polyacrylonitrile copolymers with aqueous bases.

The two major superabsorbents which are available today are cellulosic or starch-graft copolymers and synthetic superabsorbents. There are two major broad classes of synthetic superabsorbents. These are the polyelectrolytes and the nonelectrolytes. The polyelectrolytes are the most important and fall into four classes—polyacrylic acid superabsorbents, polymaleic anhydride-vinyl monomer superabsorbents, polyacrylonitrile-based superabsorbents and polyvinyl alcohol superabsorbents. Of these, the polyacrylic acid and polyacrylonitrile-based superabsorbents are most common. A with cellulosic-graft copolymer superabsorbents, the capacity of synthetic superabsorbents decreases with increasing salinity.

The polyacrylic acid class of superabsorbents includes both homopolymers and copolymers of acrylic acids and acrylate esters. The monomer units usually are polymerized to produce a water-soluble polymer which is then rendered insoluble by ionic and/or covalent cross-linking. Cross-linking of the polymer may be accomplished with a multivalent cation, radiation, or with a cross-linking agent. The absorbency of the product is determined by the number of ionizable groups, usually carboxylates, and the cross-linking density.

The cross-linking density affects not only the absorbency, but also the time required to absorb and the strength of the gel formed. Generally, the higher the cross-linking density, the stronger is the gel which is formed. The time to reach absorbent capacity decreases as the cross-linking density increases, and the absorbent capacity decreases.

After the substrate tape 60 has been impregnated, the superabsorbent material is dried to provide a film on the tape. It is desirable to impregnate the tape 60 with a film of the impregnating material instead of a powder. The impregnated tape 60 may have a density of about 0.04 to 0.06 kg/m$^2$ which includes the density of the untreated tape increased 10 to 80%, i.e. the add-on, by the treating material.

The spunbonded carrier tape 60 may be impregnated with any of several water blocking superabsorbent materials. It may be impregnated with a superabsorbent material which is derived from an aqueous solution comprising acrylate polymeric material which combines acrylic acid and sodium acrylate functionalities and water.

In another embodiment, a Reemay ® spunbonded polyester tape is impregnated with an aqueous solution comprising acrylates and acrylamide polymer powders mixed with water. The tape impregnated with such a composition has a density which may represent an increase as high as about 80% of the density of the untreated tape 60.

In general, the tape 60 may be impregnated with (1) a material comprising polyacrylic acid, or (2) a material comprising polyacrylamide or (3) blends of (1) and (2) or salts thereof or (4) copolymers of acrylic acid and acrylamides and salts thereof or (5) copolymers of (1) and (2) which include styrene as well as other similar superabsorbents. In a preferred embodiment, the impregnating material is a mixture of water and a superabsorbent material in which the mixture comprises about 4 to 12% solids when the impregnating material is an aqueous solution and applied.

Advantageously, in response to contact with water, the superabsorbent material in the cable structure 20 swells to block the flow of water including that in a longitudinal direction. The superabsorbent material also forms a gel and changes the viscosity of the ingressed water at the point of contact with the superabsorbent material, making it more viscous and consequently developing more resistance to water flow. As a result, the flow of water longitudinally along a cable from a point of entry is reduced substantially.

The tape 60 also possesses specific properties such as porosity and thickness which enhance its use as a water blocking element for a cable, particularly for a communications cable. Of importance is the need for the tape to be made of a material which has a relatively high porosity. It has been found that the water blockability of the tape increases as the porosity of the tape increases. Porosity may be measured by air permeability in units of cubic meters per square meter second at a specific water pressure. At 124 Pa of water pressure, typical porosities are in the range of about 0.7 to 5.1 m$^3$/m$^2$·s.

Evidently, because it is so porous and hence substantially cellular in structure, the tape 60 is capable of accepting a substantial quantity of the impregnating material. As a result, entering water contacts a substantial area of the impregnating material which is water blocking. There is a surprisingly fast reaction between the water blocking material and the water causing the water blocking material to swell and block off further longitudinal movement of the water along the cable.

The porosity of the untreated tape 60 decreases with increasing thickness. In a preferred embodiment, the Reemay ® tape is style 2014 which has a porosity of 4.1 $m^3/m^2 \cdot s$ at 124 Pa. Reemay tape marketed under code designation 2014 has a density of 0.03 kg per square meter, has a thickness of 0.20 mm and is formed of substantially straight polyethylene terephthalate fibers. Various other grades of Reemay spunbonded polyester tape or other similar materials may be used. Material densities of up to about 0.07 kg per square meter are practical values.

Thickness of the tape 60 also is important from another standpoint. In order to allow the cable to be terminated by standard size hardware, the diameter of the cable must be maintained within a desired range. Accordingly, the thickness of each element of the sheath system must be considered. Therefore, the thickness is established while being mindful of the porosity and the tensile strength. The tape 60 must not be too thin, else the tensile strength is affected adversely, and if too thick, the porosity and overcall cable outside diameter are affected adversely. Practical material thickness may range from about 0.13 mm to 0.30 mm thick. These values by no means limit the invention but represent the presently preferred ranges.

The sheath system of the cable 20 may also include an outer jacket 65. The outer jacket 65 may be made of a plastic material such as polyethylene and, for a cable which includes three units 24—24 of twelve optical fibers each, has an outer diameter of about 1.24 cm.

In the preferred embodiment, the jacket 65 is decoupled from the shell segments. However, it is within the scope of this invention to cause the shell segments to be bonded to an inner surface of the outer jacket. For example, an outer surface of each segment 42 may be provided with a coating of a suitable adhesive material which will cause the jacket 65 to bond to the shell 40.

Advantageously, the shell 40 of this invention also acts as a thermal barrier. As the jacket is extruded over the shell 40, heat is available for transfer into the core. The segments 42—42 of the cable 20 insulate the core against the heat caused by the extrusion of the jacket. In fact, the shell segments obviate the need for a separate, well-known thermal core wrap about the core tube 30.

The above-described cable is a cable having an all-dielectric sheath system which is attractive from many standpoints. Being all-dielectric it certainly is suitable for use in lightning-prone areas as it would not attract lightning. Also it is non-corrosive and helps to avoid the problem of hydrogen generation in optical fiber cables. Of course, it should be understood that the sheath system of cables of this invention may include metallic components.

One of its most important features is its resistance to rodent attack. Being made of a material such as those enumerated hereinbefore, it is not attractive to rodents as something to chew. The segments have great strength, are durable and discourage further attack by rodents after an initial encounter.

One of several gauges of toughness of a sheath system is a parameter referred to as toughness index. It is found by multiplying ultimate tensile strength of the material by the strain at fracture. The toughness index which is expressed as the amount of energy absorbed per unit volume of material in Newton-meters per cubic meter is modified to minimize effects of other parameters of the cable. Because the modified toughness index which is expressed in units of Newtons-meters per cubic meter is a reliable indicator of the resistance to deformation wear caused by rodents, there is a correlation between increasing toughness and improving performance in cage tests. The cage test is well known and is described in the aforementioned paper by N. J. Cogelia, et al.

Figure 5:
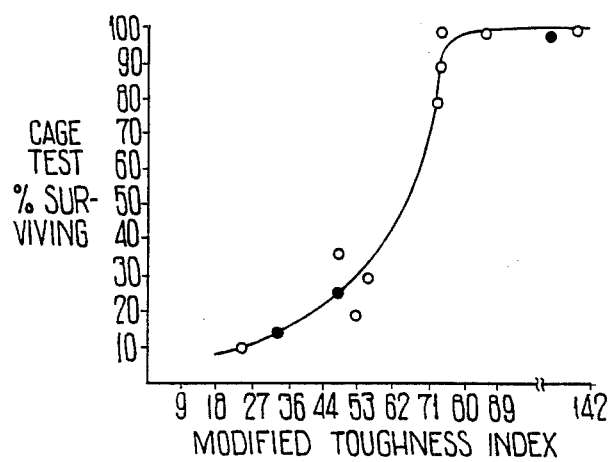
FIG. 5 is a graph which depicts percent of cables surviving in a cage test versus a parameter referred to as modified toughness index.

The relationship between modified toughness index and percent surviving specimens is easily determined from the graph shown in FIG. 5. A correlation of improving performance with increasing toughness is readily apparent.

In the Cogelia, et al. article, a table is provided to show a comparison of relative performance of one and two pair buried or distribution service wires with a helically applied shield. The modified toughness index and cage test percent surviving for a shield comprised of CPA 195 precipitation temper copper alloy were reported at 53 and 20 respectively whereas those parameters for a shield made of stainless steel type 304 annealed were 142 and 100. For an optical fiber cable of this invention having eight segments comprised of a fiber reinforced plastic material and 0.76–0.89 mm thick with a breaking strength of 357 kg, the modified toughness index was 105 and the percent surviving the cage test was in the range of 90 to 100.

In view of the advantages of having an all-dielectric sheath system free of possible hydrogen generation but having inherent lightning protection, one can readily appreciate the value of the cable of this invention.

The cables of this invention have been described as being rodent resistant. A rodent chewing into the plastic matrix will experience difficulty in penetrating the plastic. This experience discourages subsequent attacks by the same rodent. It should be apparent that such cables may be made resistant not only to rodents but also to any animals such as sharks, for example, which have a propensity for attacking cables.

In view of the foregoing, it should be readily apparent that the cable of this invention has excellent utility in the outdoor environment because of its outstanding protection against rodents and lightning. However, the cable of this invention also is adaptable to use indoors. Of course, use indoors demands that the cable be fire resistant. The segments which form the shell may be caused to have excellent resistance to fire and smoke evolution. If the outer jacket is made of a fire-resistant material such as polyvinyl chloride, the cable also may be used indoors as a riser cable, for example.

It is to be understood that the above-described arrangements are simply illustrative of the invention. Other arrangements may be devised by those skilled in the art which will embody the principles of the invention and fall within the spirit and scope thereof.

We claim:

1. An animal-resistant cable, which comprises:
   a core which comprises at least one transmission media; and
   a sheath system which encloses said core, said sheath system comprising:
   a plurality of longitudinally extending segments each of which has a cross section transverse to a longitudinal axis of the cable that encloses less than one-half the periphery of said core, and each of which is made of a dielectric material, said segments cooperating to provide a shell enclosing said core with at least portions of facing longitudinal edge surfaces of adjacent segments being substantially contiguous, and said segments being stranded helically about said core and being sufficient in number to allow said cable to be routed in a path having a predetermined radius without damaging said cable; and at least one outer element being disposed about said segments and being effective to hold said segments in the configuration of said shell.

2. The cable of claim 1, wherein the dielectric shell comprises at least eight longitudinally extending segments.

3. The cable of claim 1, wherein each of said segments comprises a homogeneous plastic material.

4. The cable of claim 3, wherein each of said segments comprises a fiber reinforced plastic material.

5. The cable of claim 1, wherein the number of said segments is optimized to provide sufficient flexibility and so as not to impede the alignment of said segments during manufacture of said cable.

6. The cable of claim 1, wherein said cable includes an outer jacket comprising a plastic material disposed about said segments.

7. The cable of claim 1, wherein said predetermined radius is at least as low as about the product of ten and the outer diameter of said cable.

8. The cable of claim 1, wherein a binder is wrapped helically about said segments.

9. The cable of claim 1, which also includes a layer of a water blocking material which is disposed between the dielectric shell and said core.

10. The cable of claim 9 wherein said water blocking material is selected from the group consisting of:
(a) polyacrylic acid,
(b) polyacrylamide;
(c) blends of (a) and (b);
(d) salts of (a) and (b);
(e) copolymers of (a) and (b); and
(f) copolymers of (a) and (b) which include styrene.

11. The cable of claim 1, wherein said segments form a generally circular shell which encloses said core and wherein each of said shell segments is provided with a coating of a superabsorbent material.

12. The cable of claim 11, wherein said coating comprises a superabsorbent mixture in which the mixture comprises about 4 to 12% by weight of solids.

13. The cable of claim 1, which also includes an outer plastic jacket and a waterblocking tape which is disposed between said shell and said outer jacket.

14. The cable of claim 13, wherein an outer surface of each of said segments is bonded to an inner surface of said outer jacket.

15. The cable of claim 14, wherein an outer surface of each of said shell segments is provided with an adhesive material which bonds to said jacket.

16. The cable of claim 1, wherein each of said segments is provided with one longitudinal edge surface which has a projecting portion and another longitudinal edge portion which includes a longitudinal extending groove adapted to receive the projecting portion of an adjacent segment.

17. The cable of claim 1, wherein each of said segments has a rectangular cross section transverse to the longitudinal axis.

18. The cable of claim 1, wherein each of said segments has a trapezoidal cross section transverse to the longitudinal axis.

* * * * *